Aug. 22, 1933.   B. KIRSCH   1,923,676
AUTOMOTIVE HEATER
Filed March 3, 1932   2 Sheets-Sheet 1
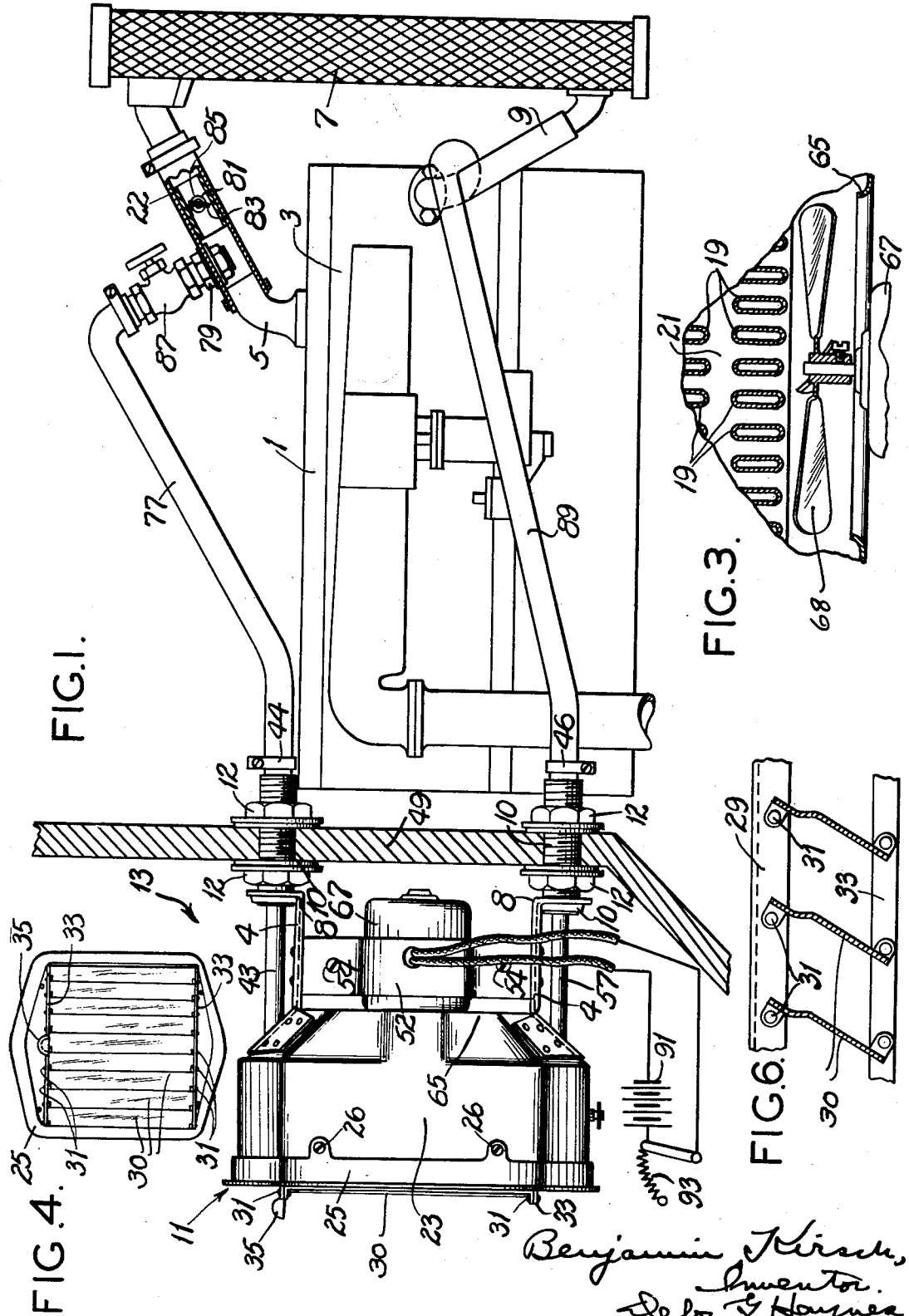

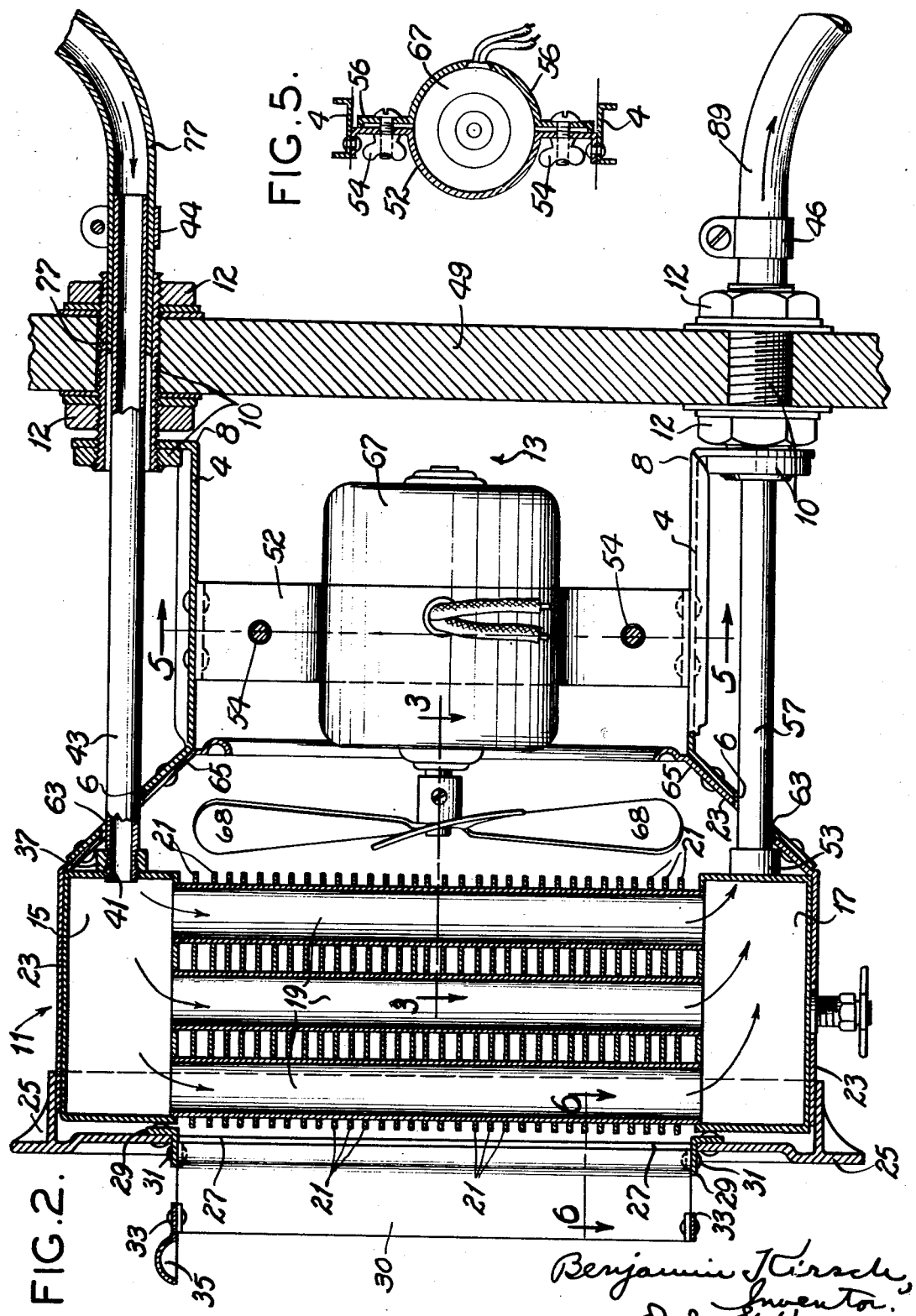

Patented Aug. 22, 1933                                                          1,923,676

UNITED STATES PATENT OFFICE 1,923,676

AUTOMOTIVE HEATER

Benjamin Kirsch, Chicago, Ill., assignor to Auto Radiator Manufacturing Co., Chicago, Ill., a Corporation of Illinois Application March 3, 1932. Serial No. 596,520

7 Claims. (Cl. 257—137)

This invention relates to heaters, and with regard to certain more specific features to automotive heaters for motor cars and the like.

Among the several objects of the invention may be noted the provision of an automotive heater of improved construction including an improved arrangement of rigid support and non-rigidly cradled fluid conducting members; the provision of a heater of the class described having an improved form of deflector; and, the provision of such a heater having a removable air circulating unit. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a side elevation of the assembled apparatus, parts being broken away for clarity;

Fig. 2 is an enlarged longitudinal section of a heating unit and connections therefor;

Fig. 3 is a cross section taken on line 3—3 of Fig. 2;

Fig. 4 is a reduced end elevation of the shutter of the heating radiator, taken from the left in Fig. 1;

Fig. 5 is a cross section taken on line 5—5 of Fig. 2; and,

Fig. 6 is a horizontal section taken on line 6—6 of Fig. 2.

Similar reference characters indicate corresponding parts throughout the several views of the drawings.

Referring now more particularly to Fig. 1, there is shown at numeral 1 an automotive engine for driving a motor vehicle. This engine 1 includes a water circulating jacket 3 normally used for purposes of cooling said engine 1. The jacket 3 has a connection 5 with the ordinary automotive cooling radiator 7 and a return connection 9. Thus operation of the engine 1 results in a circulation of heated water from the jacket 3, through the connection 5, through the cooling radiator 7 and back to the jacket 3 by way of the return connection 9.

The present invention refers to a heating radiator connected into said water circulating system so that heat which might otherwise be uselessly dissipated may, in cold weather, be used for heating purposes in the tonneau of the vehicle.

Numeral 11 refers broadly to the heating unit in the tonneau 13. The tonneau compartment of the vehicle is entirely separated from the engine compartment so that obnoxious engine gases and heat do not pass to the tonneau compartment. This unit 11 comprises an upper header 15 and a lower header 17 connected by relatively flat water tubes 19. These tubes 19 are relatively flat in the fore and aft direction as shown in Fig. 3 and are surrounded by a series of horizontally disposed radiating fins 21. These fins conduct heat from hot water in the tubes 19, from whence the heat is swept away by convection of air passing between the fins 21. The parts 19 and 21 comprise a circulating core. The headers 15 and 17, tubes 19 and fins 21 form a simple, rigid, unitary structure. It is the assembly of headers and tubes, together with their inlet and outlet pipes that should not be stressed and strained during motion of the vehicle; and the cradling support which is effected for these parts, and which is hereinafter described, comprises one of the features of this invention.

Over the headers 15, 17 and surrounding the tubes 19 and fins 21 is slidably fitted a sheath 23, preferably composed of a sheet metal stamping which is applied over the rear of the headers 15, 17 and heat transfer devices 19, 21. Over the front of said elements 15, 17, 19 and 21 is positioned a front cover 25 which telescopes over the edge of and is held to the sheath 23. The front cover 25 and sheath 23 are held together by screws 26.

As shown in Figs. 4 and 6, the front cover 25 has a central opening 27 to the upper and lower edges of which are riveted angle members 29. Between the angle members 29 are hinged at points 31 a series of shutters 30 forming adjustable louvers. The shutters are constrained to function with parallel motion by upper and lower links 33 pivoted to the shutters, the upper one of the links 33 being provided with a finger piece 35 for permitting manual operation. In Figs. 2 and 6, the shutters are shown in open position and in Fig. 4 they are closed. It will be noted that the shutters are vertically arranged so that they effect adjustable vertical louvers and not adjustable horizontal louvers. This means that the warm air projected from the device may be directed forwardly or to either side in the vehicle and be completely adjustable from full off to full on. This eliminates projecting the air up into the dead space under the cowl or projecting it downwardly toward the floor where it might otherwise pick up germ-laden dirt and the like.

Attached to the upper header 15 is a boss 37. In the boss 37, and shown at numeral 41, is a bore adapted to threadably receive an iron water-carrying pipe 43.

The lower header 17 is also provided with a boss 53 similar to the boss 37 and having threaded therein an outlet pipe 57.

It will be noted from the above that the headers 15 and 17, the circulating tubes 19 and the inlet and outlet pipes 43 and 57 respectively form a unitary structure, which, because of the requirements of water tightness should not be subjected to stresses and strains due to weaving of the parts on which they are supported. In the present invention these parts are not subjected to such stresses or strains, because they are cradled in the surrounding sheaths 23, 25.

The bosses 37 and 53 are in alinement with openings 63 in a rearward funnel shaped extension 65 of the sheath 23. The actual supports 4 for the device are riveted to the extension 65 and are also provided with aligning openings 6 permitting a clear passage therethrough of the pipes 43, 57. These supports 4 pass rearwardly to points 8 where they are formed outwardly to surround the pipes 43 and 57 and have attached thereto and subsequently soldered bushings 10, the latter being held to the dash 49 of the vehicle by means of suitable nuts 12. Thus the bushings 10, brackets 4, housings 23 and 25 form a unitary structure serving as a cradling support for the interior water-carrying structure, the latter comprising elements 43, 57, 15, 17 and 19.

The bushings 10 entirely clear the pipes 43 and 57 so as to permit applications of the hoses 77 and 89 around the pipes 43 and 57 with suitable clamps 44 and 46. The hoses 77 and 89 therefore form a padding between the bushings 10 and the pipes 43 and 47.

The lengths of the brackets 4 closely parallel the lengths of the pipes 43 and 57 and are formed flatly, as shown, so as to form areas to which the bracket 52 may be riveted. This bracket 52 has removably clamped thereto by means of thumb screws 54 a clamp bracket 56 for supporting a motor 67 (Fig. 5).

In order to force air through the heating radiator 11, there is provided the motor 67 on the extension 65, this being done by means of said cross bracket. From the above it will be seen that the upper hose 77 comprises an inlet to the heater and it preferably passes to a connection 79 in the hose 5 between the cooling radiator 7 and engine 3. The connection 79 is made below a cylindrical thermostat 81 which has been previously inserted into said hose 5. The thermostat 81 is of known design comprising in the cylinder 22 thereof a rotatable cut-off valve 83 under control of a bi-metallic spiral member 85. When the circulating water attains a predetermined temperature, the bi-metallic spiral 85 changes its form so as to move the valve 83 to a position to open the passage to the cooling radiator 7. Thus when the engine 1 is started, the valve 83 is closed and substantially all of the circulating water is delivered to the heating radiator 11 and hence full advantage is taken of what little heat there is in the water at this time. When the temperature rises the valve 83 opens gradually and automatically to supply the cooling radiator 7 with water. Thus a maximum rate of action of the heating radiator 11 is insured. A valve 87 permits of cutting off the heating radiator 11 in the warm season.

The lower rubber hose 89 passes to the return connection 9 of the radiator 7. Thus it will be seen that there is parallel circulation set up between the engine 1 as a source and the cooling radiator 7 on the one hand and the heating radiator 11 on the other hand. The radiators 7 and 11 deliver returns by way of pipes 9 and 89 respectively. The resulting circulation I refer to as being in a parallel circuit as distinct from a series arrangement of the radiators 7 and 11.

As shown in Fig. 1, the fan motor 67 is wired to the battery 91 and in circuit with the rheostatic controller 93, whereby the speed of the motor may be varied.

From the above it will be seen that this construction provides the advantages of a rigid supporting structure which does not carry liquids and which may therefore be stressed and strained without danger. This structure comprises the bushings 10, the brackets 4, the cradling members 23 and 25. This rigid structure also supports the adjustable louver.

Within the above rigid supporting structure lies an integral assembly comprising the circulating pipes 43 and 57, together with the headers 15, 17 and the water tubes 19 with their fins 21. This latter assembly is cradled, and is not subject to bending stresses and strains, because there is no cantilever effect. The headers are carried forwardly and the pipes 43 and 57 are aligned resiliently by means of the hoses 77 and 89.

At the same time the brackets 4 provide convenient points for the motor support therebetween. Also, the motor 67, with the fan blades 68 may be readily removed by loosening the wing nuts and removing the sideward bracket 56.

It will also be noted that the rigid structure which cradles the water-carrying structure also supports the fan motor and fan. Thus the mechanical supporting structure, together with the mechanical air moving means is all in one unit and the water circulating means is all in a second unit which is protected against stresses and strains caused by operation in the automotive vehicle.

Regarding the adjustable deflectors for effecting adjustable louvers, they may be swung angularly on either side of the parallel direction of the air and to substantially completely close the air outlet when they lie in substantially a single plane. The latter addition is shown in Figs. 1 and 4.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. An automotive heater comprising a rigid unit consisting of an upper and a lower header water circulating tubes therebetween, inlet and outlet pipes attached thereto, a second rigid unit comprising supporting brackets, cradling means surrounding said headers, and bushings rigidly attached to the brackets and surrounding said inlet and outlet pipes but being separated from said pipes.

2. An automotive heater comprising a rigid unit consisting of an upper and a lower header, water circulating tubes therebetween, inlet and outlet pipes attached thereto, a second rigid unit comprising supporting brackets, cradling means surrounding said headers, bushings rigidly attached to the brackets and surrounding said inlet and outlet pipes but being separated from said pipes, and means for attaching said bushings to the portion of the vehicle carrying the heater, and flexible hoses attached to the inlet and outlet pipes and being positioned between said pipes and said bushings respectively.

3. In an automotive heater, headers, water circulating tubes joining said headers, a casing cradling said headers and tubes, brackets rigidly attaching said casing to the portion of the vehicle which carries the heater, and water inlet and outlet tubes extending to the headers and being separated from said brackets, said brackets having attaching bushings surrounding the inlet and outlet tubes and flexible hoses attached to the tubes and being positioned between the same and the bushings, respectively.

4. In an automotive heater, headers, water circulating tubes joining said headers, a casing cradling said headers and tubes, brackets rigidly attaching said casing to the portion of the vehicle which carries the heater, water inlet and outlet tubes extending to the headers and being separated from said brackets, motor supporting means attached to said brackets, a motor on said last-named means between the brackets, and a fan driven by said motor and located within said cradling casing.

5. In an automotive heater, headers, water circulating tubes joining said headers, a casing cradling said headers and tubes, brackets rigidly attaching said casing to the portion of the vehicle which carries the heater, water inlet and outlet tubes extending to the headers and being separated from said brackets, motor supporting means attached to said brackets, a motor on said last-named means between the brackets, and a fan driven by said motor located within said cradling casing, and air deflecting means attached to the first-named rigid assembly on the side of said water circulating tubes which is opposite to the fan side of said water circulating tubes.

6. In an automotive heater an outlet opening for warm air, and vertically arranged, adjustable louvers associated with said outlet, said louvers comprising a plurality of deflectors hinged vertically at the top and bottom edges of said opening and means for effecting parallel motions of said deflectors, said last-named means comprising at least one link pivoted to said deflectors, said deflectors being adapted to deflect the air angularly on either side of the normal direction of air movement.

7. In an automotive heater an outlet opening for warm air, and vertically arranged, adjustable louvers associated with said outlet, said louvers comprising a plurality of deflectors hinged vertically at the top and bottom edges of said opening and means for effecting parallel motions of said deflectors, said last-named means comprising at least one link pivoted to said deflectors, said deflectors being adapted to deflect the air angularly on either side of the normal direction of air movement and to substantially completely close said opening when lying substantially in a plane.

BENJAMIN KIRSCH.